June 21, 1960   J. B. HARMAN   2,941,694
COMPOSITE TUBE STRUCTURE
Filed Sept. 15, 1958
FIG.1.
FIG.2.
FIG.3.
FIG.4.
FIG.5.
FIG.6.
FIG.7.
FIG.8.
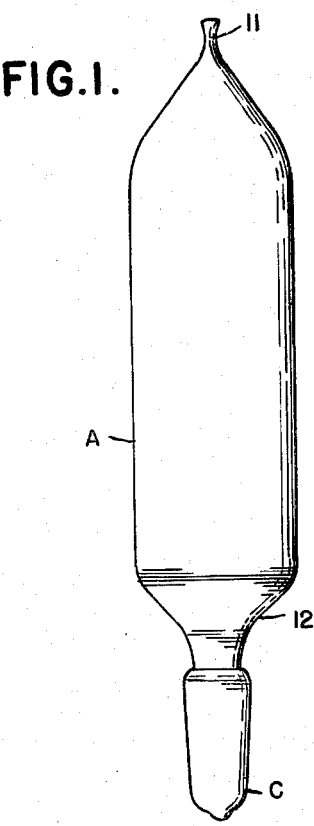
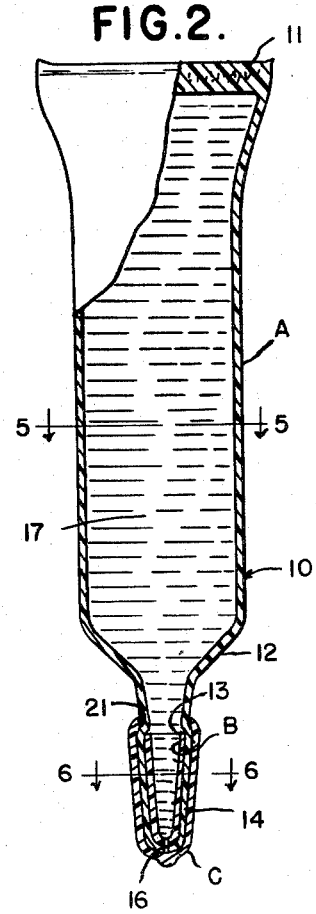
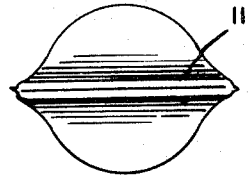
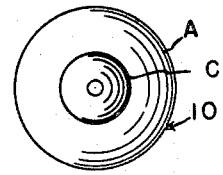
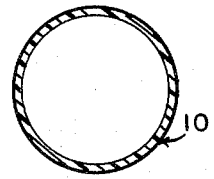
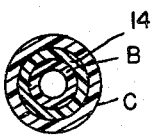
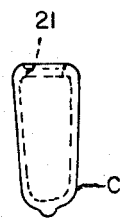
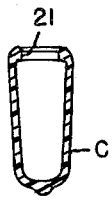
INVENTOR
JACK B. HARMAN
BY
Whittemore, Hulbert & Belknap
ATTORNEYS

United States Patent Office 2,941,694
Patented June 21, 1960

2,941,694

COMPOSITE TUBE STRUCTURE

Jack B. Harman, Royal Oak, Mich., assignor to Watts Electric & Mfg. Co., Birmingham, Mich., a corporation of Michigan Filed Sept. 15, 1958, Ser. No. 761,065

4 Claims. (Cl. 222—107)

This invention relates generally to a composite tube structure for containing flowable materials, and refers more particularly to tubes made from a plastic material which have a supported nose or spout portion and a cap for sliding over the nose or spout portion to a releasably secured position.

One of the essential objects of this invention is to provide a composite tube made of two plastic materials of high and low hardness and a cap structure of a high hardness and having a different color than the tube structure.

Another object is to provide a composite tube wherein the body portion thereof is preferably made from a vinyl plastisol of low hardness, and a core made from a vinyl plastisol of high hardness which is fused to the nose or spout portion of the tube to afford support thereto.

Another object is to provide a composite tube wherein a hardened core undersupports the nose or spout portion of the tube against collapse.

Another object is to provide a composite tube structure having a nose or spout portion about which is formed an inwardly directed shoulder, and a cap having an inwardly directed rim engageable with the shoulder to hold the cap in an assembled position.

Another object is to provide a composite tube structure wherein the tube body is preferably made from a vinyl plastisol of low hardness so that it is yieldable under finger pressure to urge fluid contents through an open tube end, with the tube walls resisting breakage and acute or permanent bends which result in excessive wall stresses and early tube failure.

Another object is to provide a cap for such a composite tube structure which is made from a relatively hard vinyl plastisol which is slidable over the nose or spout of the tube structure and has a rim engageable with a shoulder about the nose or spout portion to hold the cap in assembled position with the cap and the tube being of contrasting colors so that the location of the cap on or off the tube can be readily ascertained.

Other objects, advantages and novel details of construction of this invention will be made more apparent as this description proceeds, especially when considered in connection with the accompanying drawing, wherein:

Figure 1 is an end elevational view of a tube having a cap inserted thereon.

Figure 2 is a partially sectioned side elevational view of the cap and tube structure shown in Figure 1.

Figure 3 is an end view of the sealed portion of the tube shown in Figure 2.

Figure 4 is a view of the tube end opposite from that shown in Figure 3 and showing the nose or spout portion of the tube in Figure 2.

Figure 5 is a section taken at 5—5 of Figure 2.

Figure 6 is an enlarged section taken at 6—6 of Figure 2.

Figure 7 is an elevational view of the tube cap.

Figure 8 is a view in section of the cap of Figure 7.

In the drawing A is the body portion, B is a hard core insert, and C is a removable cap of a composite tube structure 10 embodying my invention.

As shown, the body portion A is formed from a relatively soft durable plastic material, such as a vinyl plastisol of low hardness, and comprises at one end a straight sealed portion 11 and at the other end has an inwardly tapered portion 12 with a shoulder 13 connected to a spout portion 14.

Inserted in, and preferably fused to, the inner walls of spout 14 is a core B made from a relatively hard durable plastic material, such as a vinyl plastistol of high hardness, with shoulder 13 abutting the open end thereof. An opening 16 is formed in the end of core B and spout 14 to provide an exit for the contents 17 of tube structure 10. The opening 16 would normally be formed immediately prior to the first use of the tube structure 10 so that during tube manufacture, storing, shipping, and handling the contents thereof are not accidentally discharged.

The cap C is preferably formed of a relatively hard, durable plastic material, such as a vinyl plastisol of high hardness, and has formed at the inner periphery of the open end an inwardly extending rim 21 which is adapted to slide over the outer surface of spout 14 and engage shoulder 13 in its innermost assembled position so that the cap is releasably secured to the spout 14 to prevent accidental release or removal. The cap C is of preferably a bright yellow color to provide a ready identification, both on and off the tube, and when the body portion A of the tube structure 10 is formed of a blue plastic, an attractive color contrast is provided.

With the cap C on the spout 14, foreign matter or dirt is prevented from entering into opening 16 and accidental discharge of the tube contents from spout 16 is resisted.

In use the tube is filled with a flowable material, such a lubricant, a cleanser, an adhesive, a powder, a medicament, a food stuff, a cream, a lotion or the like. The rim 21 of cap C is dislodged from the shoulder 13 adjacent spout 14 by a simple pulling action on the side walls of the cap after which the rim 21 will slide along the length of the spout 14 until it is disengaged. The spout end is then exposed at which time opening 16 may be formed if it has not been previously provided. The tube walls then may be pressed to urge the tube contents through opening 16, the size of which will depend upon the contents and their intended use. Due to the plastic properties of the walls, severe and sharp bends are prevented so that the tube life is exceptionally long and therefore makes the tube adaptable for containing large quantities of tube material usable over an exceptionally long period. A further factor in the tube longevity is provision of the hardened core insert B which not only prevents compression or restriction of the spout portion 14 which would make discharge of tube contents difficult or impossible, but it also widens the range of tube use to include those applications where the spout portion 14 must be inserted through a confined opening, such as would be the case in particular lubrication applications.

While a particular tube construction has been shown, it is, of course, possible to apply the principle herein disclosed to a wide range of tube constructions for various tube uses with the body A dimensions, the core B dimensions, the spout 14 dimensions, and others being variable, depending upon a particular tube application.

While the preferred embodiment discloses core B as an undersupport for spout 14, it could be bonded to the outer walls of spout 14 if desired.

The drawing and the foregoing specification constitute a description of the improved composite tube structure in such full, clear, concise and exact terms as to enable any person skilled in the art to practice the inven-

What I claim as my invention is:

1. A tube structure comprising a tubular body formed of a relatively soft plastic material, said tubular body having a sealed end, and an open end, a portion of the tubular body adjacent said open end being tapered towards the tube axis and the open end to form a spout portion having a spout passage therethrough for discharge of tube contents, a supporting core insert formed of a relatively hard plastic material in contact with the inner walls of said spout portion to support said spout portion against contraction of the spout passage due to externally applied manual bending or pressing forces and to strengthen the spout portion to increase its usefulness in discharging tube contents, said insert including a passage extending longitudinally therethrough and in alignment with said spout passage, said spout portion having a shoulder directed towards the tube axis and spaced from said open end, the end of the insert remote to said open end of the tubular body engaging said shoulder internally of said tubular body to provide reinforcement therefor, and a cap tapered like the spout portion and formed of a relatively hard plastic material sleeved upon said spout portion, said cap including an annular rim directed toward the axis of the tubular body and releasably engaged with said shoulder externally of said tubular body to detachably retain said cap in position on said spout portion.

2. A tube structure comprising a tubular body formed of a relatively soft vinyl plastisol, said tubular body having a sealed end, and an open end, a portion of the tubular body adjacent said open end being formed of conical sections successively tapering less towards the tube axis and the open end of the tube to form a spout portion having a spout passage therethrough for discharge of tube contents, a supporting core insert formed of a relatively hard vinyl plastisol in contact with the inner walls of the terminal conical section of said spout portion to support said terminal conical section against contraction of the spout passage due to externally applied manual bending or pressing forces and to strengthen the spout portion to increase its usefulness in discharging tube contents, said insert including a passage extending longitudinally therethrough and in alignment with said spout passage, said spout portion having a shoulder in said terminal conical section directed towards the tube axis, spaced from said open end and positioned adjacent an intermediate conical section, the end of the insert remote to said open end of the tubular body engaging said shoulder internally of said tubular body to provide reinforcement therefor, and a cap tapered like the terminal conical portion and formed of a relatively hard vinyl plastisol sleeved upon said terminal conical portion, said cap including an annular rim directed toward the axis of the tubular body and releasably engaged with said shoulder externally of said tubular body to detachably retain said cap in position on said spout portion.

3. Spout and cap structure comprising an elongated hollow conical member of relatively soft plastic material, said conical member including a wide end, and a narrow end having an opening therethrough, a shoulder formed on said conical member, said shoulder being directed towards the axis of the conical member and spaced from said narrow end of said conical member, a supporting core insert formed of a relatively hard plastic material in contact with the inner walls of said conical member to provide support therefor, said insert including a spout passage extending longitudinally therethrough and in alignment with the opening in the narrow end of the conical member, the end of the insert remote to the narrow end of said conical member engaging said shoulder internally of said conical member to provide reinforcement therefor, and a cap formed of relatively hard plastic material sleeved upon said narrow end of said conical member, said cap including an annular rim directed toward the axis of the conical member and releasably engaged with said shoulder externally of said conical member to detachably retain said cap in position on said conical member.

4. Spout and cap structure comprising an elongated tubular member having a wide and a narrow end, said tubular member being formed of conical sections successively tapering less toward the axis of the tubular member and the narrow end of the tubular member, a supporting core insert formed of a relatively hard vinyl plastisol in contact with the inner walls of the terminal conical section forming the narrow end of said member to support said terminal conical section, said insert including a passage extending longitudinally therethrough and in alignment with the axis of said tubular member, said terminal conical section having a shoulder directed towards the axis of the tubular member, spaced from said narrow end of the tubular member, and positioned adjacent an intermediate conical section, the end of the insert remote to the narrow end of the tubular member engaging said shoulder internally of said conical member to provide reinforcement therefor, and a cap tapered like said terminal conical section and formed of a relatively hard vinyl plastisol sleeved upon said terminal conical section, said cap including an annular rim directed toward the axis of the tubular member and releasably engaged with said shoulder externally of said conical member to detachably retain said cap in position on said terminal conical section.

References Cited in the file of this patent

UNITED STATES PATENTS

| | | |
|---|---|---|
| 722,508 | Horn | Mar. 10, 1903 |
| 1,892,788 | Schwartz | Jan. 3, 1933 |
| 2,136,033 | Van Rossem | Nov. 8, 1938 |
| 2,349,962 | Harris | May 30, 1944 |
| 2,679,954 | Barnes | June 1, 1954 |
| 2,792,149 | Lutz | May 14, 1957 |

FOREIGN PATENTS

| | | |
|---|---|---|
| 180,839 | Switzerland | Jan. 16, 1936 |